United States Patent
Riediger et al.

(10) Patent No.: US 10,102,193 B2
(45) Date of Patent: *Oct. 16, 2018

(54) INFORMATION EXTRACTION AND ANNOTATION SYSTEMS AND METHODS FOR DOCUMENTS

(71) Applicant: Recommind, Inc., San Francisco, CA (US)

(72) Inventors: Julian Markus Riediger, San Francisco, CA (US); Andy Horng, San Francisco, CA (US)

(73) Assignee: Open Text Holdings, Inc., Wilmington, DE (US)

( * ) Notice: Subject to any disclaimer, the term of this patent is extended or adjusted under 35 U.S.C. 154(b) by 850 days.

This patent is subject to a terminal disclaimer.

(21) Appl. No.: 14/452,484

(22) Filed: Aug. 5, 2014

(65) Prior Publication Data

US 2015/0026559 A1 Jan. 22, 2015

Related U.S. Application Data

(63) Continuation of application No. 13/948,069, filed on Jul. 22, 2013, now Pat. No. 8,856,642.

(51) Int. Cl.
G06F 17/00 (2006.01)
G06F 17/24 (2006.01)
G06F 17/30 (2006.01)

(52) U.S. Cl.
CPC ............ *G06F 17/241* (2013.01); *G06F 17/00* (2013.01); *G06F 17/30* (2013.01)

(58) Field of Classification Search
CPC .............................. G06F 17/241; G06F 17/30
(Continued)

(56) References Cited

U.S. PATENT DOCUMENTS 6,014,680 A 1/2000 Sato et al.
7,958,164 B2 6/2011 Ivanov et al.
(Continued)

FOREIGN PATENT DOCUMENTS

EP 3072063 A1 9/2016
WO WO0227542 4/2002
(Continued)

OTHER PUBLICATIONS

International Search Report and Written Opinion dated Feb. 10, 2014 in Patent Cooperation Treaty application No. PCT/US2013/051698, filed Jul. 23, 2013.
(Continued)

*Primary Examiner* — Stephen Hong
*Assistant Examiner* — Matthew Ludwig
(74) *Attorney, Agent, or Firm* — Carr & Ferrell LLP

(57) ABSTRACT

Information extraction and annotation systems and methods for use in annotating and determining annotation instances are provided herein. Exemplary methods include receiving annotated documents, the annotated documents comprising annotated fields, analyzing the annotated documents to determine contextual information for each of the annotated fields, determining discriminative sequences using the contextual information, generating a proposed rule or a feature set using the discriminative sequences and annotated fields, and providing the proposed rule or the feature set to a document annotator.

19 Claims, 18 Drawing Sheets

(58) Field of Classification Search
USPC .................. 715/230, 254, 255; 704/4, 9
See application file for complete search history.

(56) References Cited

U.S. PATENT DOCUMENTS

| | | |
|---|---|---|
| 7,996,211 B2 | 8/2011 | Gao et al. |
| 8,010,341 B2 | 8/2011 | Achan et al. |
| 8,140,323 B2 | 3/2012 | Johnson et al. |
| 8,204,738 B2 | 6/2012 | Skuratovsky |
| 8,306,922 B1 | 11/2012 | Kunal et al. |
| 8,311,950 B1 | 11/2012 | Kunal et al. |
| 8,433,558 B2 | 4/2013 | Bangalore et al. |
| 8,856,642 B1 | 10/2014 | Riediger et al. |
| 2003/0212544 A1 | 11/2003 | Acero et al. |
| 2004/0078190 A1 | 4/2004 | Fass et al. |
| 2008/0162111 A1 | 7/2008 | Bangalore et al. |
| 2008/0221874 A1 | 9/2008 | Cao et al. |
| 2010/0145902 A1 | 6/2010 | Boyan et al. |
| 2010/0293451 A1 | 11/2010 | Carus |
| 2011/0029854 A1* | 2/2011 | Nashi .................. G06F 17/3089 715/229 |
| 2011/0047171 A1 | 2/2011 | Paparizos et al. |
| 2011/0055206 A1 | 3/2011 | Martin et al. |
| 2012/0030157 A1 | 2/2012 | Tsuchida et al. |
| 2012/0099792 A1 | 4/2012 | Chevion et al. |
| 2013/0054419 A1 | 2/2013 | Yusko et al. |
| 2013/0073571 A1 | 3/2013 | Coulet et al. |
| 2013/0297412 A1 | 11/2013 | Batra et al. |
| 2014/0208218 A1* | 7/2014 | Carasso .................. G06Q 10/00 715/738 |
| 2015/0074507 A1 | 3/2015 | Riediger et al. |

FOREIGN PATENT DOCUMENTS

| | | |
|---|---|---|
| WO | WO2012030954 | 3/2012 |
| WO | WO2015012812 | 1/2015 |
| WO | WO2015074071 | 5/2015 |

OTHER PUBLICATIONS

Begum et al. A Greedy approach for computing longest common subsequences. 2008. [retrieved on Jan. 22, 2014] Retreived from the Internet: <http://www.sms.edu.pk/journals/jprm/jprmvol4/jprm9_4.pdfl>.

Kondrak et al. N-gram similarity and distance. 2005. [retreived on Jan. 22, 2014] Retrieved from the Internet: <http://citeseerx.ist.psu.edu/viewdoc/download?doi=10.1.1.67.9369&rep=rep1&type=pdf>.

Non-Final, dated Dec. 17, 2013, U.S. Appl. No. 13/948,069, filed Jul. 22, 2013.

Allowance, dated May 8, 2014, U.S. Appl. No. 13/948,069, filed Jul. 22, 2013.

International Search Report and Written Opinion dated Apr. 3, 2015 in Patent Cooperation Treaty application No. PCT/US2014/066214, filed Nov. 18, 2014.

"Partial Supplementary European Search Report," European Patent Application No. 14861758.2, Jun. 23, 2017, 13 pages.

* cited by examiner

COMPANY X is pleased to have the opportunity to assist Client A ("CLIENT A" or "Client") with a systems integration project ("Project"). At present, an agreement that includes the complete terms of this engagement is still under development. In order to facilitate company experts of COMPANY X's involvement in the Project, COMPANY X and CLIENT A agree to the following: [illegible] This letter agreement will expire when the parties sign a complete agreement, which will supersede and replace this interim letter agreement. Until such time, this document serves as our statement of work and unless specified otherwise will be governed by the terms, conditions and other provisions herein.

Based on the agreed scope, timeline and FTE support, we have allotted for the project an estimated cost in the amount of USD XXX,XXX.

Overall timing for the project will start with [illegible] and is expected to be completed by June 1, 2011. This timing assumes that i) all relevant data are readily available, ii) representative CLIENT B staff will be available for participation and iii) project leadership are readily available for deliverable reviews.

This Statement Of Work [illegible] is made a part of and shall be governed by and between Consultant and Company X and constitutes a Statement of Work under the Master Services Agreement dated January 1st, 2009 thereinafter called the "Agreement") which is incorporated herein by reference as if fully restated herein.

Grab defined keyword context (X characters/words before and after annotated text)

Normalize user selections

*FIG. 6* starting ⟶ start (freq=1)

begins
begin ⟶ begin (freq=2)

*FIG. 8*

["made and entered this", "effective this"]
*(2 different cluster center subsequences)*

+

"This agreement is made this"
*(new instance context)*

=

["made ———————this", "e-e-t-i-e this"]
*(subsequence alignments with both cluster centers)*

Contiguity(String x):

String[] matches = x.split(gaps)

Integer[] lengthOfMatches = {match.length() : matches}

String[] gaps = x.split(words)

Integer score = matches.length() + gaps.length()

score -= variance(lengthOfMatches)

Return score

*FIG. 10*

MeanLength(String x):

String[] matches = x.split(gaps)

Integer[] lengthOfMatches = {match.length() : matches}

Return mean(lengthOfMatches)

*FIG. 11*

```
LongestContiguousSubsequence(String A, String B):
   Slot[] slots = new Slot[A.size()][B.size()]
   for (Int i : range(A.size)):
      for (Int j : range(B.size)):
         if (i == 0 or j == 0):
            slots[i][j] = 0;
         else:
            if (A[i] == B[j]):
               slot[i][j] = maximum match score out of slots[i-1][j-1], slots[i][j-1], slots[i-1][j]
               if match scores are equal:
                  if (Math.min(MeanLength of A match, MeanLength of B) < n):
                     choose match
                  else:
                     Resolve same match scores by contiguity score
            Else:
               slot[i][j] = maximum match score out of slots[i][j-1], slots[i-1][j]
               Resolve same scores by contiguity score
```

*FIG. 12*

For each Si:

Extract longest contiguous common subsequence between Si and C

Mi = longest contiguous common subsequence in Si (with matches, insertions, deletions specified)

For each Mi:

Split Mi into n-grams (size specified by n)

Gi := array of n-grams

Convert Gi into array of match percentages

Vi := mapping of Gi into match percentages (For each Gij in Gi, Vij = (# of matches in Gij)/n)

F = concatenate_length_wise(Vi)

C := new context n := window size for each individual feature

Si := user-specified sequences

Mi := subsequence match of Si between corresponding Si and C

Vi := feature vector generated from each Si

F := complete feature vector

*FIG. 13*

INFORMATION EXTRACTION AND ANNOTATION SYSTEMS AND METHODS FOR DOCUMENTS

CROSS-REFERENCE TO RELATED APPLICATION

The present application is a continuation of and claims the priority benefit of U.S. patent application Ser. No. 13/948,069, filed Jul. 22, 2013, now U.S. Pat. No. 8,856,642, issued Oct. 7, 2014, and titled Information Extraction and Annotation Systems and Methods for Documents, the disclosure of which is incorporated herein by reference including all references cited therein.

FIELD OF THE INVENTION

The present technology may be generally described as systems and methods for extracting information from documents and determining annotation instances via analysis of the extracted information using various methods such as rule-based methods and feature-based methods.

BACKGROUND

In traditional approaches to information extraction, both engineering and domain knowledge are required to build an extractor that is used to extract information from documents. An extractor engineer using a complex development environment creates extractors manually. Especially for simple in-text fields (which constitute a majority of fields in most extraction projects), the generation of effective extraction rules seems possible for a domain expert without engineering knowledge. However, the complexity of the development environment currently requires extractor engineering knowledge that most domain experts do not possess.

SUMMARY

According to some embodiments, the present technology is directed to a method that includes: (a) receiving, by a context analysis module, annotated documents, the annotated documents comprising annotated fields; (b) analyzing, by the context analysis module, the annotated documents to determine contextual information for each of the annotated fields; (c) determining discriminative sequences using the contextual information; (d) generating, by the context analysis module, a proposed rule or a feature set using the discriminative sequences and annotated fields; and (e) providing, by the context analysis module, the proposed rule or the feature set to a document annotator.

According to some embodiments, the present technology is directed to a system that includes: (a) a processor; and (b) logic encoded in one or more tangible media for execution by the processor, the logic when executed by the processor causing the system to perform operations comprising: (i) receiving annotated documents comprising annotated fields; (ii) analyzing the annotated documents to determine contextual information for each of the annotated fields; (iii) determining discriminative sequences using the contextual information; (iv) generating a proposed rule or a feature set using the discriminative sequences and annotated fields; and (v) providing the proposed rule or the feature set to a document annotator.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 6 illustrates a context analysis process for selected strings having similar annotated fields;

FIG. 8 illustrates a process of determining a frequency of occurrence of subsequences;

FIG. 10 is an exemplary set of executable instructions for calculating the contiguity of words within a string;

FIG. 11 is an exemplary set of executable instructions for calculating the mean length of words within a string;

FIG. 12 is an exemplary set of executable instructions for calculating a longest contiguous subsequence between a pair of strings;

FIG. 13 is an exemplary set of executable instructions for creating a feature set from suggested sequences generated by the instructions of FIG. 12;

DESCRIPTION OF EXEMPLARY EMBODIMENTS

Figure 1A:
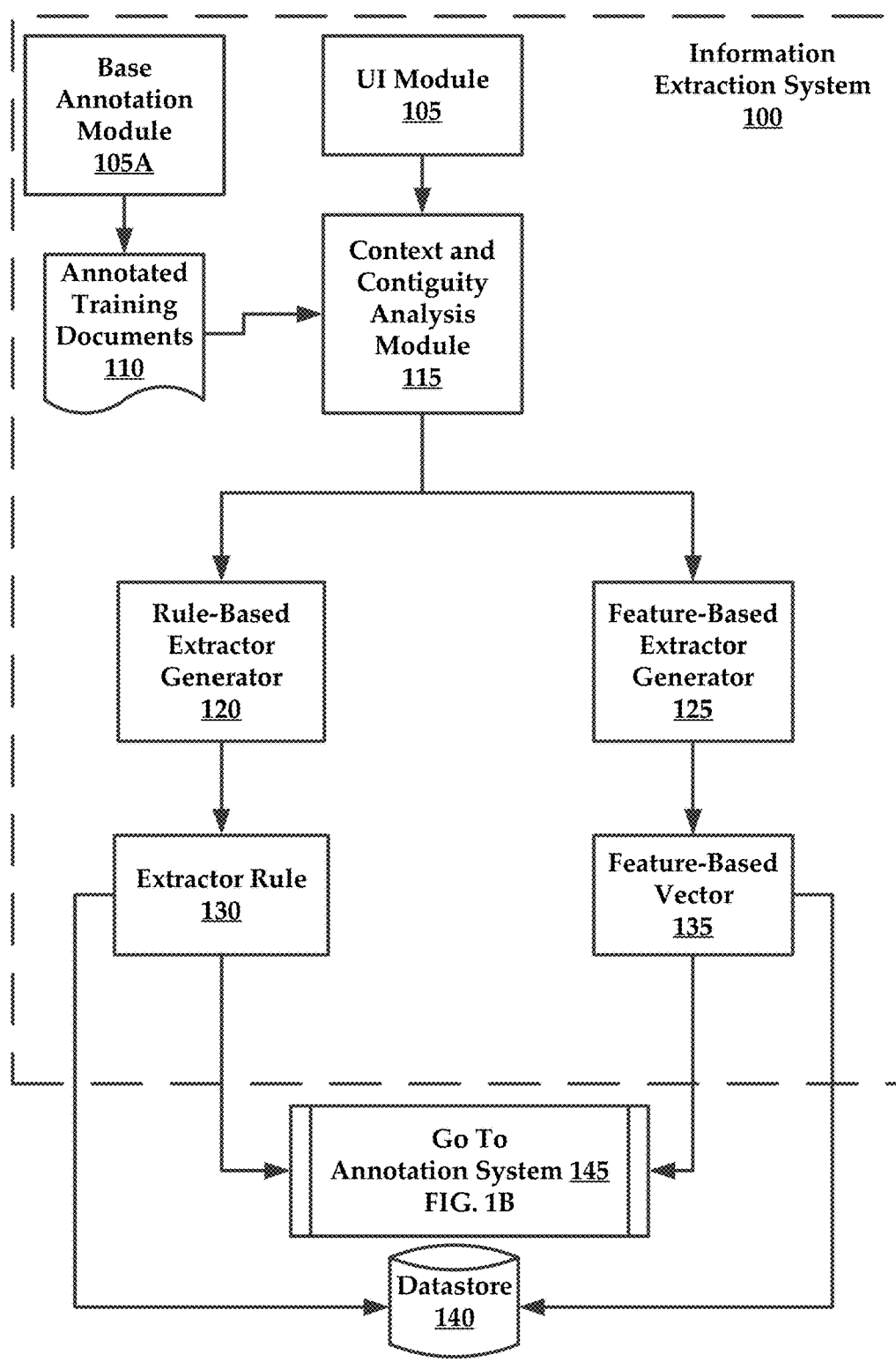
FIG. 1A is schematic diagram of an exemplary information extraction system, constructed in accordance with the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology provides systems and methods for extracting information from documents, and in some instances, unstructured and semi-structured documents such as contracts. That is, a contract may include general sections such as price, duties, warranties, and so forth. In other instances, informal contracts, such as letters of intent, may include freeform documents having information that is not arranged in any particular manner.

The present technology makes extraction of in-text fields within documents more scalable by implementing extraction methods that do not require specific programming/engineering skills, but only domain knowledge. The present technology is more scalable in comparison to manual processes where both engineering and domain knowledge are required to build an extractor that is used to extract information from documents. That is, a domain expert initially examines and annotates the documents, formulates general extraction rules, and an extractor engineer translates those rules into executable extractors that are used to process documents.

Manual approaches focus on creating optimal regular expressions from a set of examples. In contrast, the present technology may be configured to identify discriminative sequences within documents and use these discriminative sequences to develop both rule-based extractors and feature-based extractors. The term "discriminative sequence" is defined as a sequence of words within a document that are categorized as having a particular domain. For example, a discriminative sequence that indicates the start date of a contract may include the terms 'start,' 'begin,' 'commence,' or other similar terms that are spaced apart from a date within a given character proximity. In one example, the term 'start' is found within three words of a date, and is thus characterized as a discriminative sequence for a contract start field.

While optimal regular expressions try to generalize the pattern found, such methods have limitations that render the use of optimal regular expression less desirable in real-world extraction environments. Finding discriminative sequences is less ambitious in regard to generalization and therefore more suitable for real-world extraction environments.

In some instances, the present technology may utilize rule-based methods. In these methods, the user provides a sufficient number of annotations for a specified field within a set of training documents. The present technology identifies discriminative sequences in the context of these annotations. Based on these sequences rule suggestions are generated and provided to the user. The user may select or modify the suggested extraction rules and may save the extraction rules in a database. These rules (e.g., extractors) are exported into an extraction system and utilized to process target documents. This process creates an abstraction of the engineering function that would normally be performed by an extractor engineer. Thus, no programming knowledge is required by the domain expert in order to build an extractor.

According to some embodiments, the present technology may utilize sequence alignment to identify discriminative sequences in the context of a specified field. More specifically, similar sequences found in a plurality of annotated documents may be aligned with one another. Using alignment between these similar sequences, in context, discriminative sequences may be determined.

In some instances, the present technology may utilize a feature-based method for processing documents, where alignments in context are used to build features, rather than rules. These features can be used to train a classification engine. Based on a number of context-dependent features, a classification engine may decide whether a potential match is in fact the information that should be extracted.

The present technology may utilize a longest common subsequence algorithm to extract discriminative contextual features for extraction. Additionally, this longest common subsequence analysis is fine-tuned using a contiguity analysis. A greedy contiguity heuristic may be utilized to quantify aspects of contiguity within aligned sequences by analyzing the number of match segments, number of gap segments, and variance in segment length.

These and other advantages of the present technology will be described in greater detail below with reference to the drawings.

FIG. 1A illustrates an exemplary information extraction system (hereinafter "system 100") that generates and applies rule-based extractors as well as feature-based vectors. Generally, the system 100 is shown as comprising a UI (User Interface) module 105 that generates graphical user interfaces that are utilized by document annotators to upload or annotate original documents within the system 100. In some instances, the system 100 may include a base annotation module 105A that is utilized to generate annotated training documents 110. Representative UIs are described in greater detail with reference to FIGS. 5A-C, which will be described in greater detail below.

In some instances, the system 100 is configured to generate extractor rules that can be utilized by a rule-based annotator to annotate target documents. In other embodiments, the system 100 may be configured to generate feature-based vectors that can be utilized to train a classifier model annotator to annotate target documents. These various methodologies for annotating target documents will be described in greater detail below with reference to FIG. 1B.

A document annotator, such as a document domain expert may utilize various UIs to annotate the original documents to produce annotated documents. A document annotator may utilize a set of annotation tools, such as a common field lists. Again, exemplary annotation tools are illustrated and described in greater detail below with reference to FIGS. 5A-C. It will be understood that the more annotated training documents available to the system, the more robust and comprehensive of a rule set may be made available to the system 100.

Generally, annotation of a document may include associating a word, date, or other group of characters (e.g., identifiable strings) with a particular field. In some instances, the annotations may consider these identifiable strings within their context relevant to the document. For example, the word 'indemnification' may be annotated as belonging to a field "Warranty and Indemnification." The word indemnification may be confirmed as belonging to the Warranty and Indemnification field because the word indemnification was found within a certain distance from the word "warranty."

Figure 2:
FIG. 2 illustrates an exemplary annotated document.

FIG. 2 illustrates the annotation of a contract document 200. In this instance, a document annotator has annotated a first date 205 as being associated with a Start Date field, as well as a second date 210, which is also associated with another Start Date field. In this example, the Start Date is a defined field that refers to dates within a document that directly relate to a start date for beginning various types of work or other duties/performances by parties to the contract. Many standard fields may be utilized, as well as annotator-defined fields.

The system 100 may employ a context and contiguity analysis module 115 to evaluate these annotated documents, specifically to generate extractor rules 130 and feature-based vectors 135. For brevity, the context and contiguity analysis module 115 will hereinafter be referred to as the "analysis module 115". The analysis module 115 determines discriminative sequences within strings in documents that comprise annotated fields. In some instances, determining discriminative sequences comprises locating (or closely corresponding) words or groups of characters that are proximate to the field date. In some instances the analysis module 115 evaluates words appearing before and after the annotated dates.

It will be understood that a discriminative sequence may include a single word or a group of characters, or may also include a group of words, numbers, symbols, or other similar textual structures. The discriminative sequence is used as a signal or identifier that provides a context for the annotated field with which they are associated. For example, the word 'commencing' within three words of an annotated field of a date is discriminative inasmuch as the word 'commencing' indicates that the annotated date is a performance start date.

Figure 4:
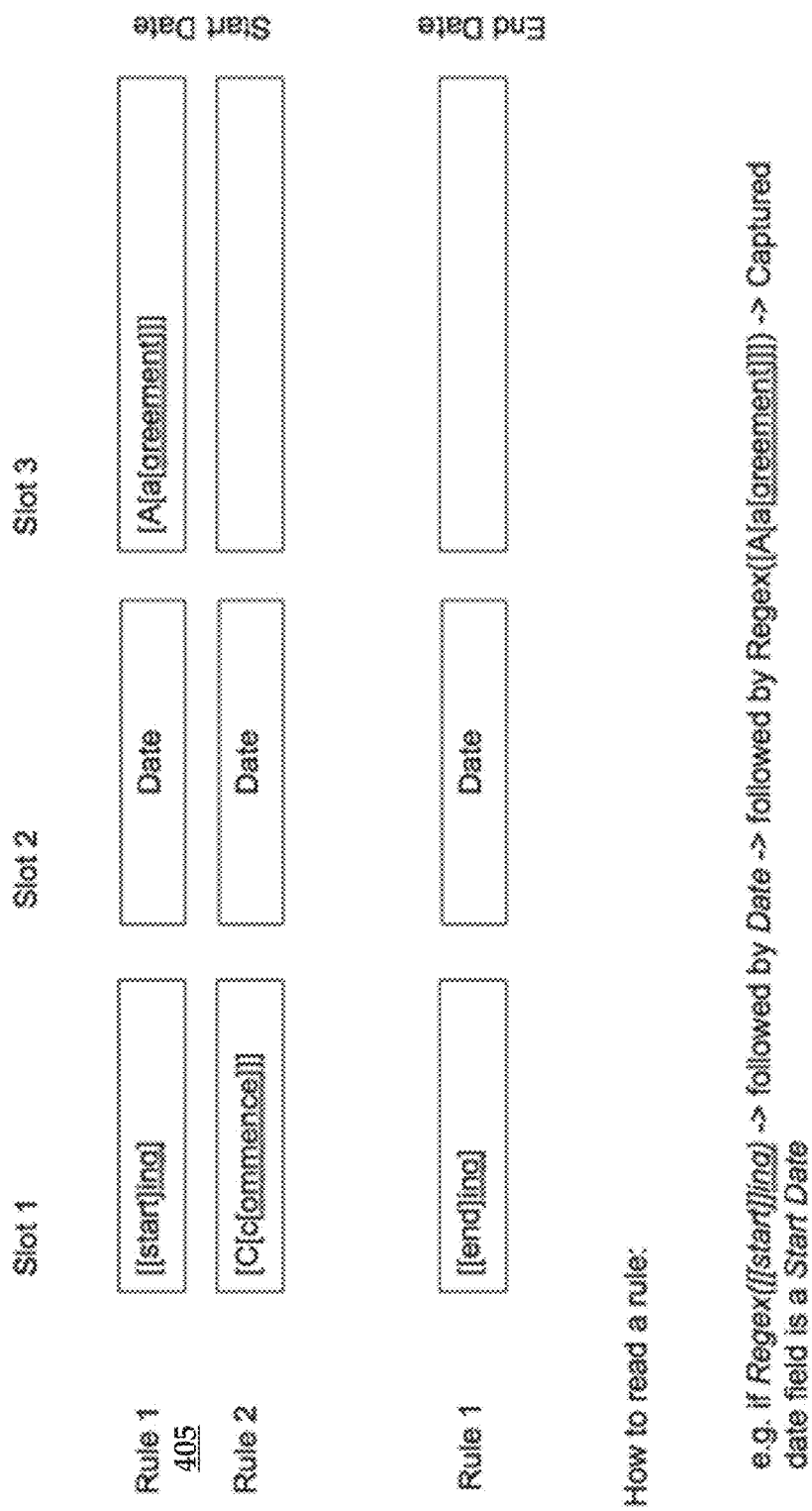
FIG. 4 illustrates the creation of exemplary rules from word vectors.

After determining discriminative sequences, a rule-based extractor 120 may utilize the discriminative sequences to generate proposed extraction rules. An exemplary rule is shown in FIG. 4. The rule-based extractor 120 may provide the document annotator with the proposed extraction rule in an algorithmic form or natural language format.

The document annotator may approve the proposed extraction rule, reject the proposed extraction rule, and/or modify the proposed extraction rule. Once approved (either directly or after modification), the rule-based extractor 120 exports the proposed extraction rule as an extractor rule 130 that may be stored in a datastore 140 or provided directly to an annotation system 145.

Figure 3:
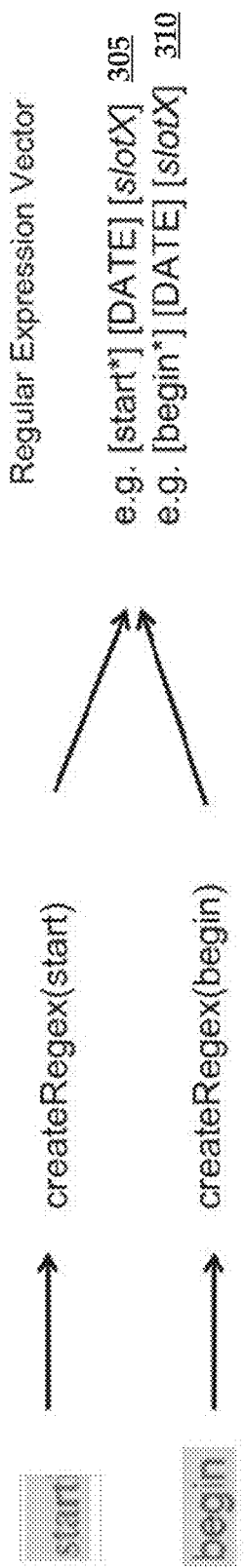
FIG. 3 illustrates the creation of exemplary word vectors.

FIG. 3 illustrates the creation of two regular expression vectors 305 and 310. It is noteworthy that each of the two regular expression vectors 305 and 310 includes a number of slots that represent preceding vector segment (slot) a target annotation segment, and a succeeding vector segment, although other segments may also be included therein.

A regular expression vector may be translated by the rule-based extractor 120 into rules that may be utilized to create an extractor rule 130. FIG. 4 illustrates the generation of two rules. A first rule 405 corresponds to the regular expression vector 305 of FIG. 3. Thus, a Start Date regular expression rule would include a Slot 1 having the characteristics of [[start]ing], which includes each of the various contextual forms of the word 'start.' Slot 2 of the first rule 405 comprises the actual date located in the document, and Slot 3 includes the characteristics of [A[a[greement]]], which includes each of the various contextual forms of the word 'agreement' including uppercase and lowercase forms of the word. It will be understood that a slot may include a representation of various permutations of a word. For example, if the words 'start' and 'starting' were determined to be discriminative relative to annotated field dates, the [[start]ing] information in Slot 1 is a way of representing this permutation.

The first rule 405 can be expressed linguistically as, "for the various regular expressions of 'start,' which are followed by a Date, where the Date is followed by various regular expressions of 'agreement,' classify or annotate the Date as a Start Date.

Figure 1B:
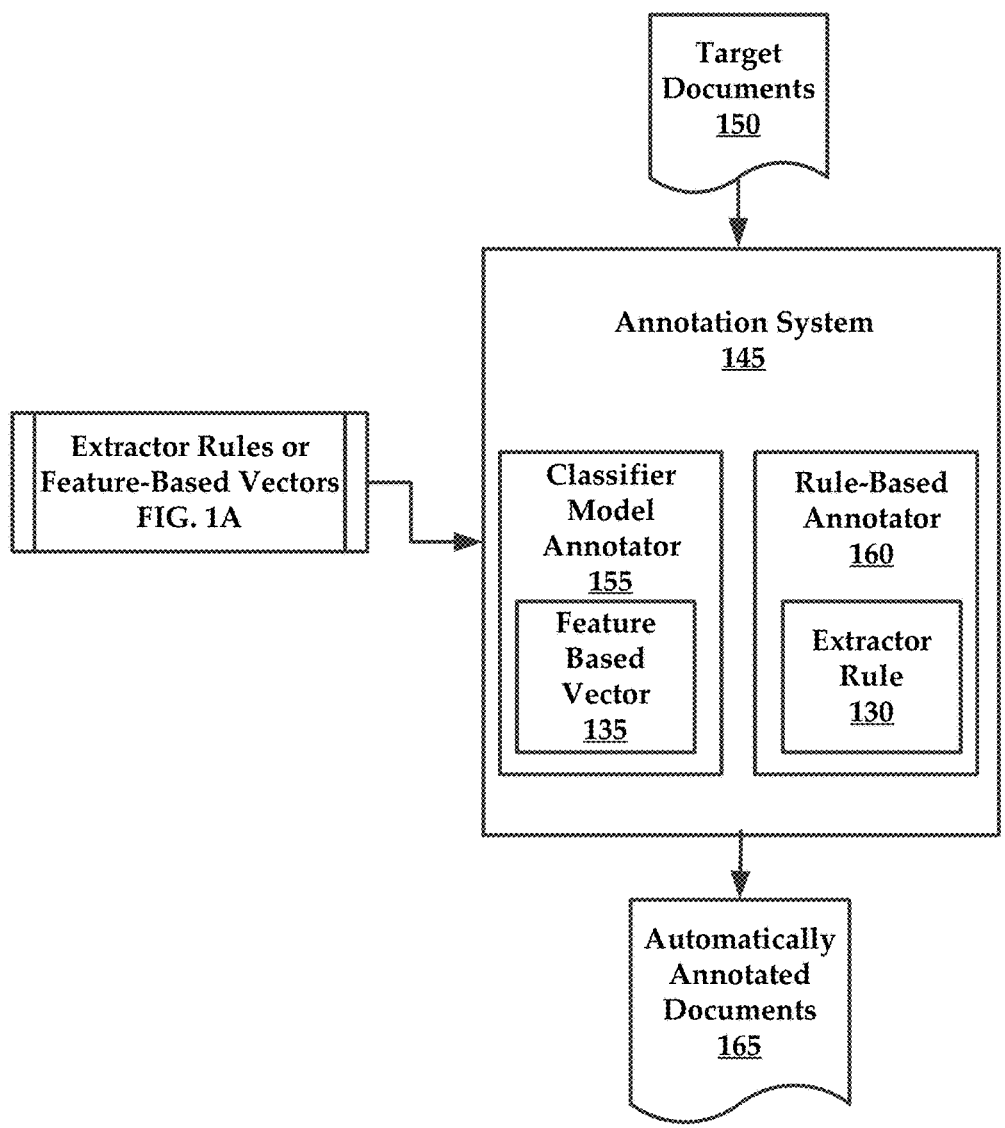
FIG. 1B is schematic diagram of an exemplary annotation system, constructed in accordance with the present technology

Turning to FIG. 1B, the annotation system 145 may apply the extractor rule 130 against target documents 150 in order to automatically annotate the target documents 150 using a rule-based annotator 160. In some embodiments, the rule may be used to locate fields within documents and extract the contents thereof. The annotation system 145 may apply the extractor rule 130 against other target documents 150 to locate Start Date fields within the target documents 150.

Automatically annotated documents 165 may be generated by the annotation system 145 initially annotating documents with base annotations. For example, the documents may be processed to determine general fields such as names, dates, and so forth. Next, strings within the target documents 150 compared by the annotation system 145 to an applied rule. If the string corresponds to the rule, the date within the string may be automatically annotated as a Start Date field. In general, the automatically annotated documents 165 may be categorized by the annotation system 145 according to the annotations specified by the rule.

Figure 5A:
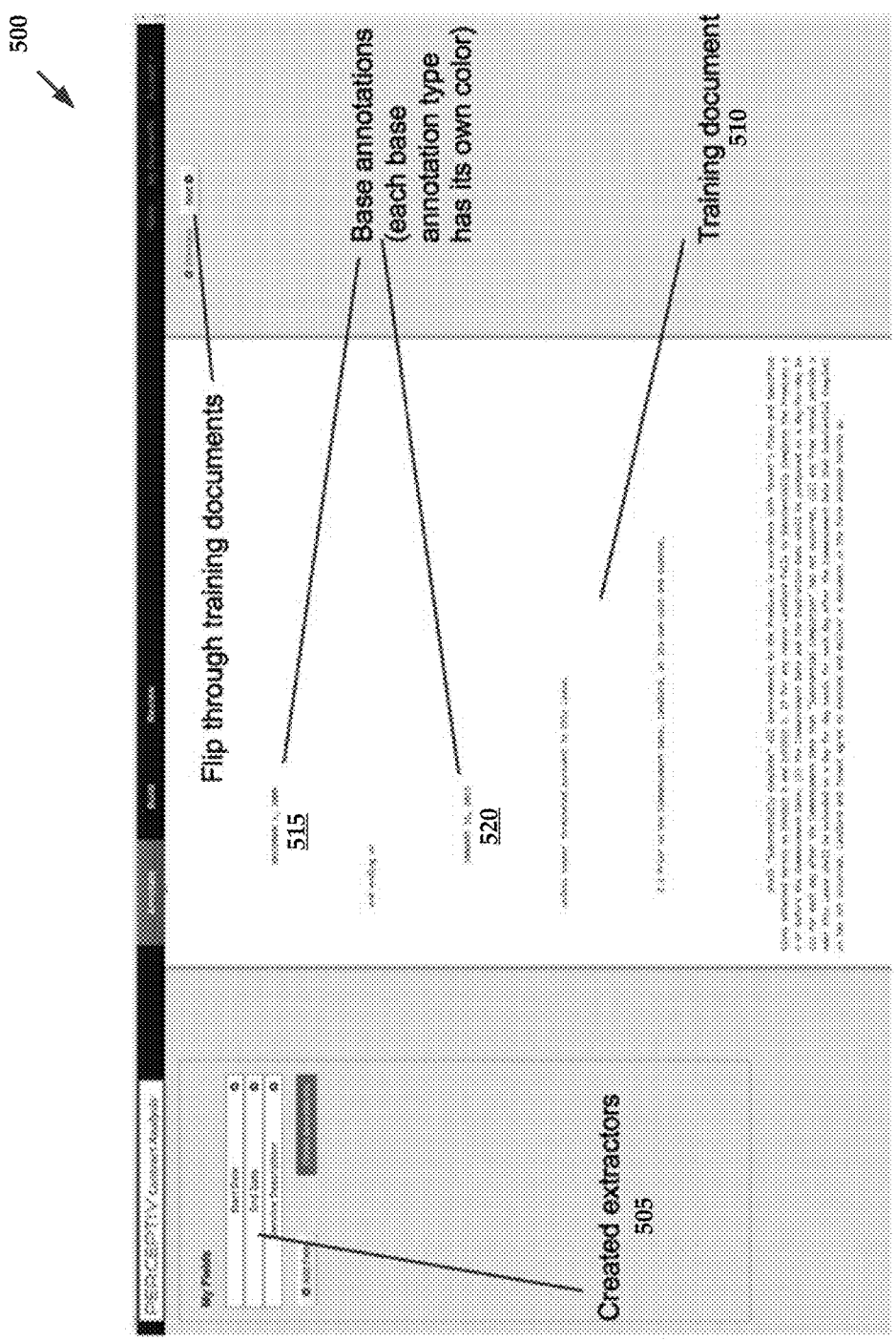
FIGS. 5A-C each illustrate various embodiments of graphical user interfaces for annotating documents.
Figure 5B:
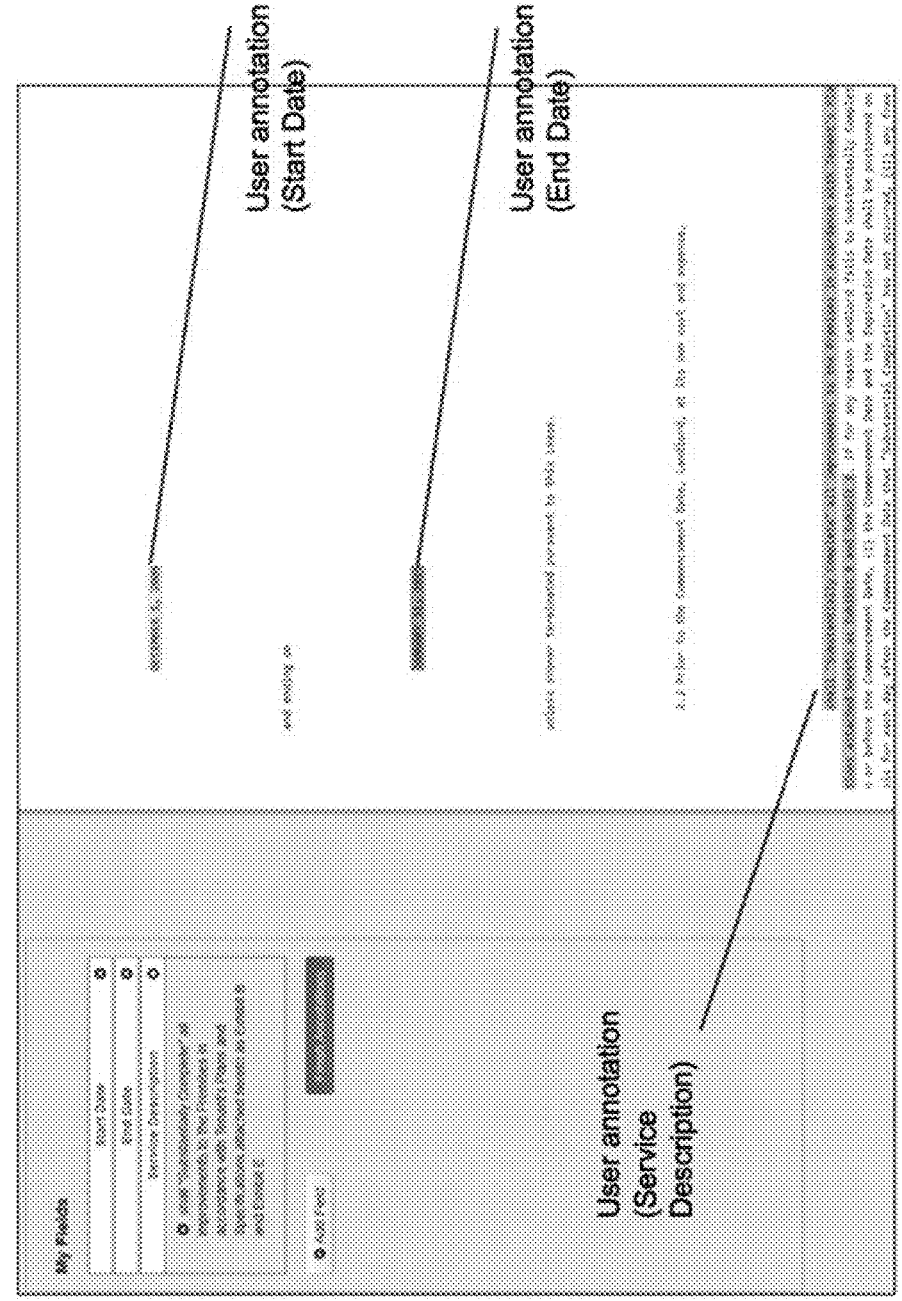
Figure 5C:
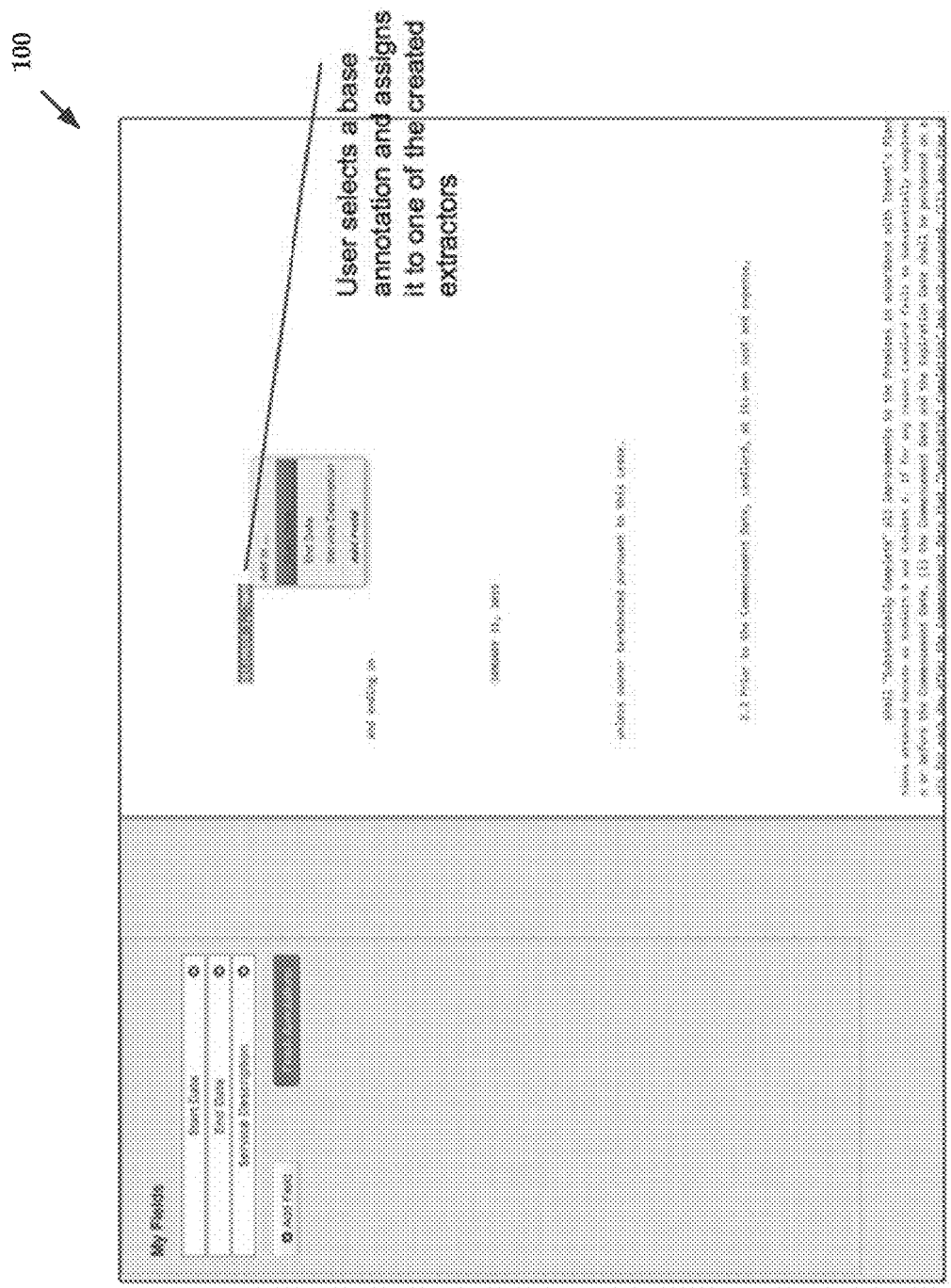

FIGS. 5A-C collectively illustrate various graphical user interfaces that are utilized by a document annotator to generate (annotate) training documents 110. FIG. 5A includes a UI 500 that comprises a list 505 of Extractor Fields that include the Extractor Fields available to the annotator. A training document 510 is loaded in to a workspace of the UI 500. Base annotations 515 and 520 are shown on the training document. These base annotations may be highlighted for the annotator using, for example, a highlighting color. It will be understood that a "base" annotation includes a basic determination that a group of characters or a word belongs to a particular field. An exemplary base annotation may include "date." A base annotator (see FIG. 1) may process a document and locate and annotate all "date" fields within the document.

FIG. 5B illustrates a UI 525 that is similar to the UI 500 of FIG. 5A, illustrating the annotation of the target document, where a document has specifically annotated dates comprising a Start Date and an End Date. FIG. 5C illustrates the process of a base annotation being selected and assigned a specific annotation.

Turning back to FIGS. 1A and 1B, the base annotation module 105A may pre-process the original documents utilizing a set of base annotations, such as Date, Name, and so forth. Base annotation of a document allows the document annotator to quickly identify words/characters that have been flagged as potentially annotatable.

Figure 7:
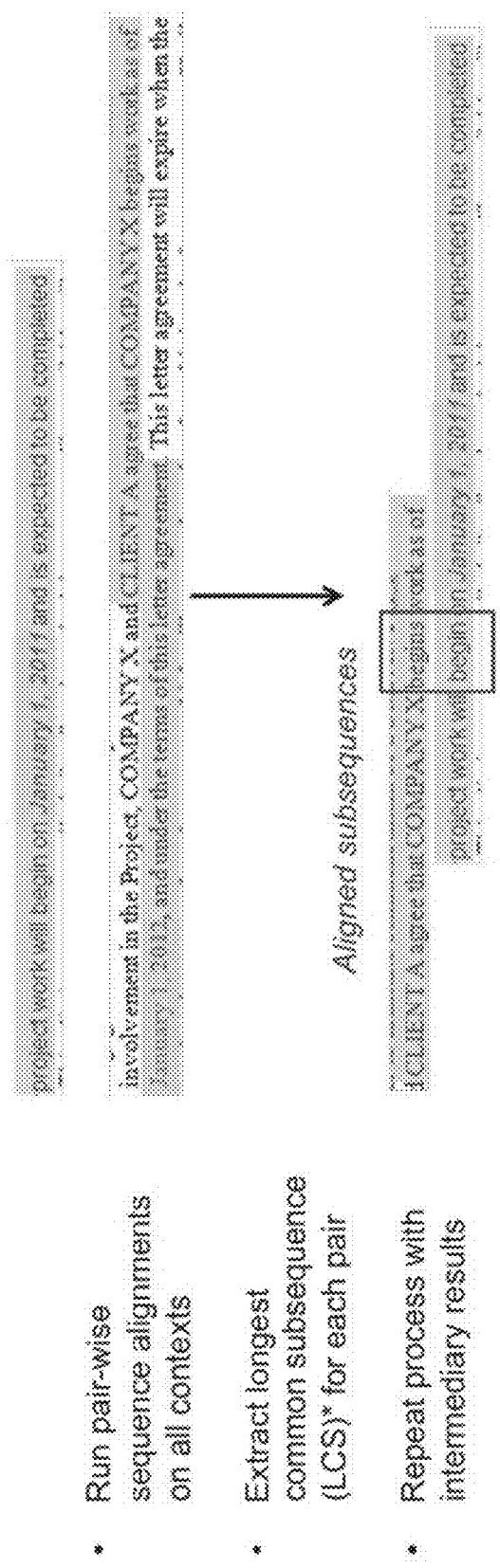
FIG. 7 illustrates a process of extracting and normalizing common subsequences.

In the example shown in FIG. 7, the contextual words 'begin' and 'begins' are found to correspond between the two aligned strings. The proximity of the words 'begin' and 'begins' relative to their respective annotated fields may also be used as a discriminative factor. That is, it is reasonable to assume that a discriminative sequence may be positioned more closely to the annotated fields, compared to words that are more remote to the annotated fields, especially when the discriminative sequence includes general words such as 'begin.'

More specifically, a pair-wise sequence alignment may be executed on all similar contexts within annotated documents. That is, the analysis module 115 may align a first string of a first date with a second string of a second date (as shown in FIG. 7), when the first and second dates have been annotated as comprising similar field types, such as Start Date. In other words, the first and second strings are aligned by the analysis module 115 because they have been annotated as belonging to the same field type.

According to some embodiments, after the documents have been annotated with base annotations, the analysis module 115 may be executed to extract a longest contiguous common subsequence (LCCS) from every possible pair of context strings found between an aligned pair of strings. In some instances, common subsequences are extracted from every possible pair of contexts, and then grouped by similarity.

The analysis module 115 initiates this LCCS process by determining a context for keywords within the aligned strings by examining characters or words that appear before or after the annotated words/characters. The analysis module 115 then cleans or normalizes subsequences by extracting all matching segments of length>$n_1$ aggregated by similarity. FIGS. 6 and 7 collectively illustrate a process of normalizing aligned strings, which have been annotated as comprising a Start Date annotation.

According to some embodiments, the analysis module 115 then assigns a frequency to each LCCS. FIG. 8 illustrates the generation of frequency scores from the annotated and contextually analyzed strings shown in FIGS. 6 and 7. For example, the context analysis module 115 has determined that an LCCS of 'start' has been found within an annotated document at a frequency of one. Additionally, the analysis module 115 has determined that an LCCS of 'begin' has been found within an annotated document at a frequency of two (see FIG. 8).

It is noteworthy that the LCCS process can be utilized to create a 'normalized' representation of similar words that may have slight differences in spelling, such as when the words 'begin' and 'begins.' The context of these words within a string provides indications to the analysis module 115 that the words are synonymous. In some instances, the context is determined by determining the distance of the word from the annotated words/characters.

In FIG. 7, the analysis module 115 has determined that an LCCS of 'begin' exists relative to the words 'begin' and 'begins.' Moreover, the context analysis conducted by the analysis module 115 implies that the words 'begin' and 'begins' are similar concepts because of their relative positions compared to the annotated words/strings (e.g., the Start Date fields).

According to some embodiments, the analysis module 115 may be configured to assume that examples that were flagged by the base annotation module 105A, but not annotated by the document annotator as a specific annotated field, as negative instances. Conversely, the analysis module 115 considers annotations specifically defined by the document annotator as positive instances.

Instead of rule suggestions, features are created (e.g., feature representation) that are used to train a classifier model annotator 155 used by the annotation system 145. More specifically, feature-based extractor generator 125 may generate feature representations that are converted into a feature-based vector 135. The system 100, and specifically the feature-based extractor generator 125, creates a feature-based vector 135 that can be utilized by the classifier model annotator 155 to annotate target documents.

In some instances, features are mapped to a high-dimensional feature representation. Exemplary classifier models may comprise a support vector machine (SVM), a decision tree, or a naïve Bayes classifier, or other similar classifier that would be known to one of ordinary skill in the art with the present disclosure before them.

The analysis module 115 may utilize discriminative sequences to create a feature representation that is based on alignment percentage and that localizes and minimizes effects of OCR errors present in the target documents 150, if any. Additionally, the feature representation may be created in such a way that it is nuanced, allowing for weighting of parts of subsequences.

With regard to determining high-dimensional feature representations, instead of building rules using the most frequently identified sequences, frequent sequences serve as cluster centers. Once the sequences for the cluster centers have been identified, each sequence is transformed into n-grams using a windowing algorithm, which will be described in greater detail below. Resulting n-grams are used to define a set of features.

Each new aligned sequence of a context is split into n-grams and the distance (e.g., alignment coverage) between the different n-grams of the feature vector is computed. The resulting feature vector holds percentages of alignment coverage for each new context.

This information may be used by the annotation system 145 to train a classifier model annotator 155 using the annotated training data, expressed as feature-based vectors. For target documents 150, new context instances are first transformed to n-gram representation and then fed to the classifier model annotator 155. In some instances, the classifier model annotator 155 allows addition of additional meta-features beyond simple analysis of context. For example, distance between subsequence matches and instances, as well as other factors such as document section and the like. Annotated documents 165 may be generated by the annotation system 145 employing the classifier module annotator 155.

Figures 9A, 9B:
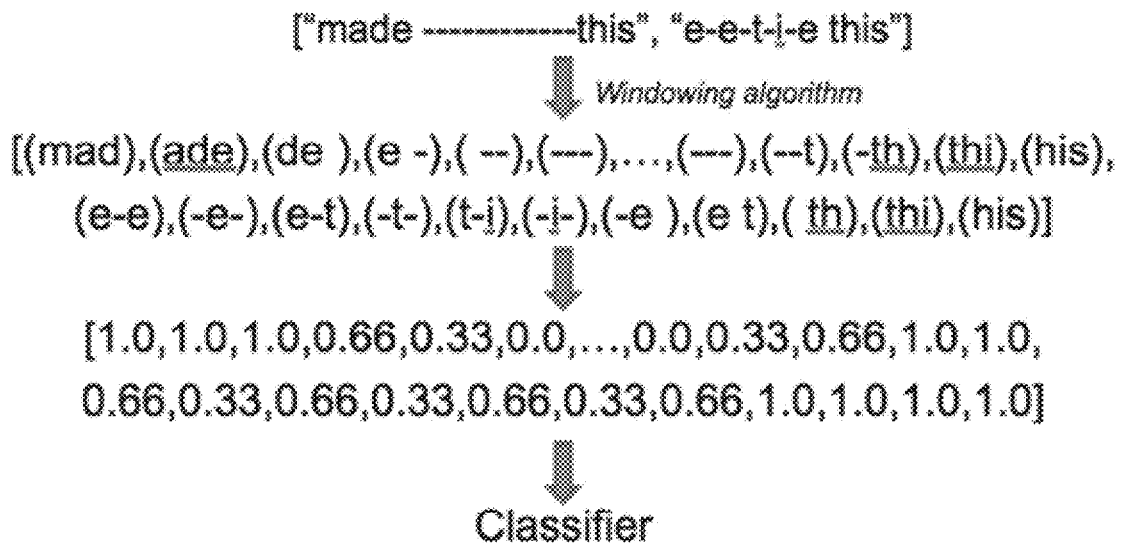
FIGS. 9A-B collectively illustrate a method of transforming context instances (e.g., subsequences) into an n-gram representation that can be utilized by a classifier model to annotate target documents.

FIGS. 9A and 9B collectively illustrate a method of transforming context instances (e.g., subsequences) into an n-gram representation that can be utilized by a classifier model to classify target documents. FIG. 9A illustrates context instances extracted from documents and FIG. 9B illustrates the transformation of these context instances into an n-gram representation using a windowing algorithm.

The dynamic programming solution to the longest common subsequence processes described herein may be augmented by the use of a greedy contiguity heuristic. This heuristic ensures that the output of the chosen classifier is close to the most contiguous of all candidates for the longest common subsequence. The heuristic may take into account number of match segments, number of gaps between segments, and variance of segment lengths. Losses due to greediness are stemmed by ensuring the heuristic is only followed if the mean of the length of currently matched segments is >n, thus reducing losses post-cleaning.

Because the heuristic is used as an additional measure on top of the match score in dynamic programming, usage of the heuristic can be controlled at each step to vary the contiguity of the final common subsequence outputted. In viewing the contextual feature extraction process as a whole, the contiguity heuristic, along with the cleaning process and variable application of greediness, ensures that sensible text features are extracted while only increasing the time and space complexities by a constant factor.

FIG. 10 is an exemplary set of executable instructions for calculating the contiguity of a string. FIG. 11 is an exemplary set of executable instructions for calculating the mean length of a string, and FIG. 12 is an exemplary set of executable instructions for calculating a longest contiguous subsequence for a pair of strings, such as String A and String B.

FIG. 13 is an exemplary set of executable instructions for creating a feature set from suggested sequences generated by the instructions of FIG. 12. Using a set of user-specified contextual character sequences, a function is created by the system 100 that maps contexts of positive/negative entities into feature vectors to train a classifier model, and similarly to map new contextual instances into a feature vector to input in the trained model.

Advantageously, features are sensitive to the similarity between specified sequences and new contexts, and the ordering of characters within each specified sequence. Additionally, the magnitude of the distance between feature vectors generated from contexts containing OCR errors and feature vectors generated from an error-free context are preferably as small as possible. The proposed feature set generation method is a realignment/windowing method, specified by executing the instructions of FIG. 13.

Figure 14:
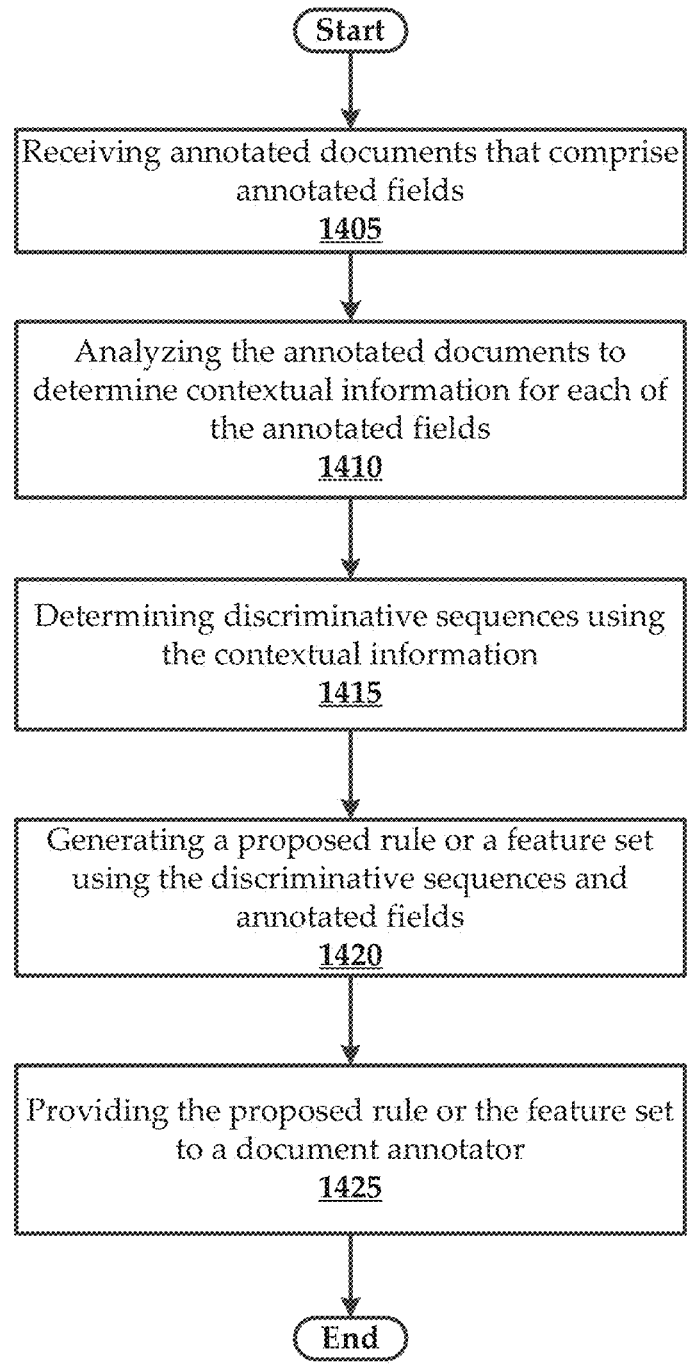
FIG. 14 illustrates a method having steps that are executed in accordance with the present disclosure.

FIG. 14 illustrates a method having steps that are executed in accordance with the present disclosure. The method includes a step 1405 of receiving annotated documents that comprise annotated fields. Again, this step may include receiving documents annotated by a document annotator. These documents may include documents that have been pre-processed by a base annotator to extract general field types.

Next, the method may include a step 1410 of analyzing the annotated documents to determine contextual information for each of the annotated fields, as well as a step 1415 of determining discriminative sequences using the contextual information. In some instances the method may include a step 1420 of generating a proposed rule or a feature set using the discriminative sequences and annotated fields and a step 1425 of providing the proposed rule or the feature set to a document annotator. The proposed rule may be provided to a rule-based extractor generator, whereas the feature set is provided to a feature-based extractor generator. The rule-based extractor generator is configured to create an extractor rule from the proposed rule using, for example, user feedback. The feature-based extractor generator generates a feature-based vector from the feature set using any of the method described in greater detail above.

Figure 15:
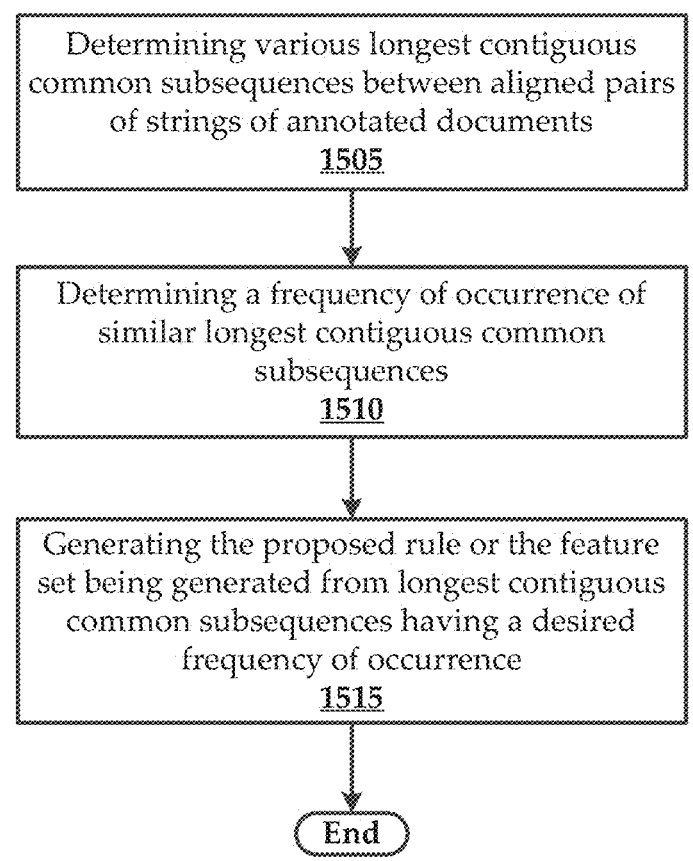
FIG. 15 illustrates another exemplary method having steps that are executed in accordance with the present disclosure.

FIG. 15 illustrates another exemplary method that includes a specific method for determining discriminative sequences, for example, a more detailed sub-method for step 1415 of FIG. 14. The method may include a step 1505 of determining various longest contiguous common subsequences between aligned pairs of strings of annotated documents. Next, the method includes the step 1510 of determining a frequency of occurrence of similar longest contiguous common subsequences. In some instances, the method allows for selection of the highest ranked similar subsequences. According to some embodiments, the method comprises the step 1515 of generating a proposed rule or a feature set from longest contiguous common subsequences having a desired frequency of occurrence. Again, the feature set may be generated from the subsequences having a high rate of frequency within the annotated documents.

As mentioned previously, the extractor system may use the features to train a classifier module that is used to classify target documents.

Figure 16:
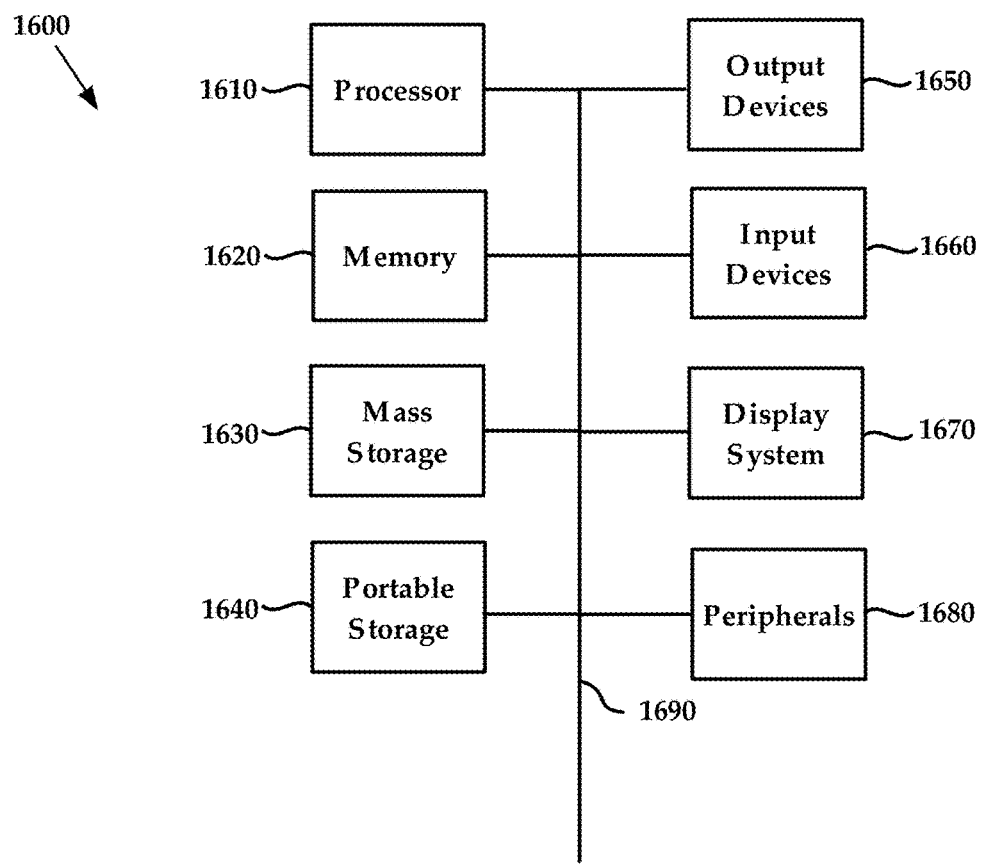
FIG. 16 illustrates an exemplary computing system that may be used to implement embodiments according to the present technology.

FIG. 16 illustrates an exemplary computing system 1600 that may be used to implement an embodiment of the present systems and methods. The computing system 1600 of FIG. 16 may be implemented in the contexts of the likes of computing devices, networks, servers, or combinations thereof. The computing system 1600 of FIG. 16 includes a processor 1610 and main memory 1620. Main memory 1620 stores, in part, instructions and data for execution by processor 1610. Main memory 1620 may store the executable code when in operation. The computing system 1600 of FIG. 16 further includes a mass storage device 1630, portable storage device 1640, output devices 1650, input devices 1660, a display system 1670, and peripherals 1680.

The components shown in FIG. 16 are depicted as being connected via a single bus 1690. The components may be connected through one or more data transport means. Processor 1610 and main memory 1620 may be connected via a local microprocessor bus, and the mass storage device 1630, peripherals 1680, portable storage device 1640, and display system 1670 may be connected via one or more input/output (I/O) buses.

Mass storage device 1630, which may be implemented with a magnetic disk drive or an optical disk drive, is a non-volatile storage device for storing data and instructions for use by processor 1610. Mass storage device 1630 can store the system software for implementing embodiments of the present technology for purposes of loading that software into main memory 1620.

Portable storage device 1640 operates in conjunction with a portable non-volatile storage medium, such as a floppy disk, compact disk or digital video disc, to input and output data and code to and from the computing system 1600 of FIG. 16. The system software for implementing embodiments of the present technology may be stored on such a portable medium and input to the computing system 1600 via the portable storage device 1640.

Input devices 1660 provide a portion of a user interface. Input devices 1660 may include an alphanumeric keypad, such as a keyboard, for inputting alphanumeric and other information, or a pointing device, such as a mouse, a trackball, stylus, or cursor direction keys. Additionally, the computing system 1600 as shown in FIG. 16 includes output devices 1650. Suitable output devices include speakers, printers, network interfaces, and monitors.

Display system 1670 may include a liquid crystal display (LCD) or other suitable display device. Display system 1670 receives textual and graphical information, and processes the information for output to the display device.

Peripherals 1680 may include any type of computer support device to add additional functionality to the computing system. Peripherals 1680 may include a modem or a router.

The components contained in the computing system 1600 of FIG. 16 are those typically found in computing systems that may be suitable for use with embodiments of the present technology and are intended to represent a broad category of such computer components that are well known in the art. Thus, the computing system 1600 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus.

Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:
1. A method, comprising:
   receiving, by a context analysis module, annotated documents, the annotated documents comprising annotated fields;
   analyzing, by the context analysis module, the annotated documents to determine contextual information for each of the annotated fields;
   determining discriminative sequences using the contextual information by:

determining, by a contiguity heuristics module, longest contiguous common subsequences between aligned pairs of strings of the annotated documents;

determining, by the contiguity heuristics module, a frequency of occurrence of similar longest contiguous common subsequences; and wherein the contiguity heuristics module generates a proposed rule from longest contiguous common subsequences having a desired frequency of occurrence;

providing, by the context analysis module, the proposed rule to a document annotator; and applying, by a rule-based annotator, a rule-based extractor to a target document to create an annotated document, the rule-based extractor being generated from the proposed rule.

2. The method of claim 1, wherein discriminative sequences are identified within the annotated documents and used to develop both rule-based extractors and feature-based extractors.

3. The method of claim 1, wherein sequence alignment is utilized to identify discriminative sequences in the context of a specified field.

4. The method of claim 1, wherein annotation of a document may include associating a word, date, or other group of characters with a particular field.

5. The method of claim 1, further comprising:
executing, by the context analysis module, a base annotation of original documents to create documents with base annotations, the base annotations comprising basic categories of words or groups of characters; and
providing the documents with base annotations to the document annotator via a user interface.

6. The method of claim 5, further comprising highlighting each of the base annotations within the user interface.

7. The method of claim 1, further comprising receiving feedback from the document annotator; and using the feedback to any of approve the proposed rule, modify the proposed rule, and reject the proposed rule.

8. The method of claim 1, further comprising converting, by a rule-based extractor generator, the proposed rule into the rule-based extractor.

9. The method of claim 1, wherein determining longest contiguous common subsequences comprises:
aligning pairs of strings having possible contextual matches;
normalizing the pairs of strings by extracting matching segments having a given length; and
aggregating the normalized pairs of strings.

10. The method of claim 9, further comprising applying a greedy contiguity heuristic to the aggregated normalized pairs of strings.

11. The method of claim 10, wherein the greedy contiguity heuristic evaluates any of a number of matching segments, a number of gaps between segments, and variances between segment lengths.

12. A system, comprising:
a processor; and
logic encoded in one or more tangible media for execution by the processor, the logic when executed by the processor causing the system to perform operations comprising:
receiving annotated documents comprising annotated fields;
analyzing the annotated documents to determine contextual information for each of the annotated fields;
determining discriminative sequences using the contextual information by:
determining, by a contiguity heuristics module, longest contiguous common subsequences between aligned pairs of strings of the annotated documents;
determining, by the contiguity heuristics module, a frequency of occurrence of similar longest contiguous common subsequences, wherein the contiguity heuristics module generates a proposed rule from longest contiguous common subsequences having a desired frequency of occurrence, wherein the proposed rule is generated using the discriminative sequences, the annotated fields and a feature set; and
providing the proposed rule or the feature set to a document annotator; and wherein a rule-based annotator applies a rule-based extractor to a target document to create an annotated document, the rule-based extractor being generated from the proposed rule.

13. The system of claim 12, wherein the discriminative sequences are identified within the annotated documents and used to develop both rule-based extractors and feature-based extractors.

14. The system of claim 12, wherein the processor further executes the logic to perform operations of:
executing a base annotation of original documents to create documents with base annotations, the base annotations comprising basic categories of words or groups of characters; and
providing the documents with base annotations to the document annotator via a user interface.

15. The system of claim 14, wherein the processor further executes the logic to perform operations of highlighting each of the base annotations within the user interface.

16. The system of claim 12, wherein the processor further executes the logic to perform operations of receiving feedback from a document annotator; and using the feedback to any of approve the proposed rule, modify the proposed rule, and reject the proposed rule.

17. The system of claim 12, further comprising a rule-based extractor generator that converts the proposed rule into the rule-based extractor.

18. The system according to claim 17, further comprising the rule-based annotator that applies the rule-based extractor to a target document to create an annotated document.

19. A method, comprising:
receiving, by a context analysis module, annotated documents, the annotated documents comprising annotated fields;
analyzing, by the context analysis module, the annotated documents to determine contextual information for each of the annotated fields;
determining discriminative sequences using the contextual information by:
determining, by a contiguity heuristics module, longest contiguous common subsequences between aligned pairs of strings of the annotated documents; and
determining, by the contiguity heuristics module, a frequency of occurrence of similar longest contiguous common subsequences, wherein the contiguity heuristics module generates a proposed rule from longest contiguous common subsequences having a desired frequency of occurrence;
generating, by the context analysis module, a feature set using the discriminative sequences and the annotated fields;
providing, by the context analysis module, the feature set to a document annotator; and applying, by a feature-based annotator, a feature-based extractor to a target document to create an annotated document, the feature-based extractor being generated from the feature set.

* * * * *